(No Model.)
W. O. TUTTLE.
CHECK ROW REEL ATTACHMENT TO PLANTERS.
No. 263,445. Patented Aug. 29, 1882.
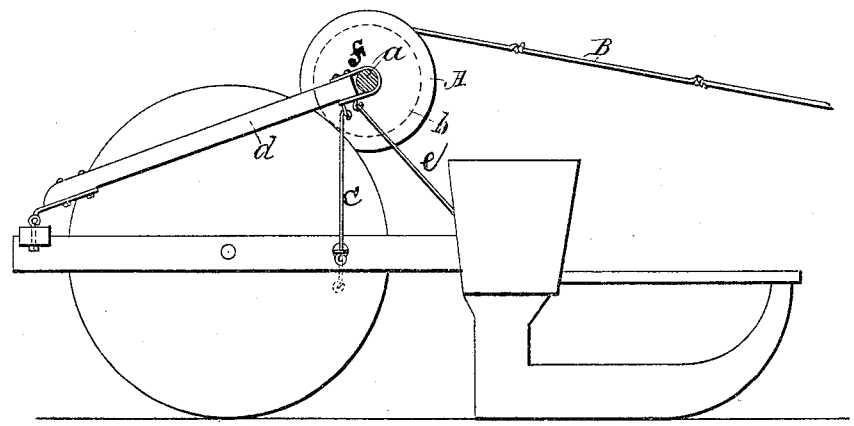
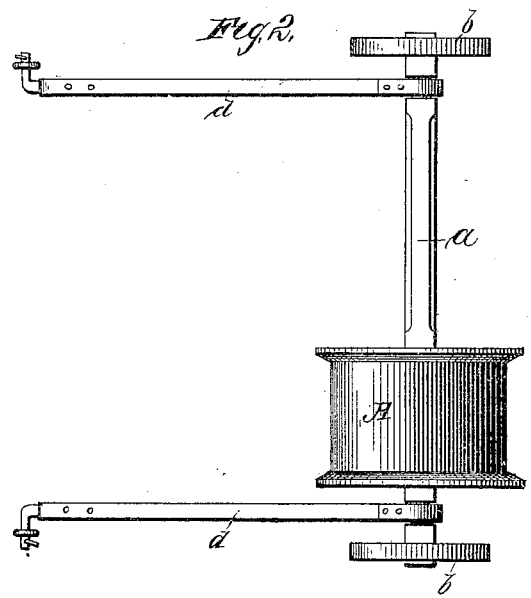
Witnesses.
Chas. Edmondson
Jas. H. Baxter
Inventor
William O. Tuttle
By Myers & Co.
Attorneys
N. PETERS. Photo-Lithographer, Washington, D. C.

UNITED STATES PATENT OFFICE.

WILLIAM O. TUTTLE, OF ATLANTA, ILLINOIS.

CHECK-ROW-REEL ATTACHMENT TO PLANTERS.

SPECIFICATION forming part of Letters Patent No. 263,445, dated August 29, 1882.

Application filed June 12, 1882. (No model.)

To all whom it may concern:

Be it known that I, WILLIAM O. TUTTLE, a citizen of the United States, residing at Atlanta, in the county of Logan and State of Illinois, have invented certain new and useful Improvements in Check-Row-Reel Attachments to Planters, of which the following is a specification, reference being had therein to the accompanying drawings.

This invention relates to improvements in check-row-reel attachments to planters, and has for its object to effect the ready and easy winding and unwinding thereof in laying off the field for the operation of the check-row machine; and it consists of a reel or drum adapted to permit the coiling or winding thereon of a cable or line, and secured to a shaft having disks or rolls, the same constituting an appliance for a check-row and planting machine, to which it is capable of attachment, substantially as hereinafter more fully set forth.

In the accompanying drawings, Figure 1 is a side view of a check-row and planting machine with my improvement applied thereto. Fig. 2 is a plan view of the same.

In carrying out my invention I employ a reel or drum, A, preferably of the windlass form, or, in other words, a plain cylinder with flanged heads. Upon this drum or reel is coiled or wound the check-row line or cable B, knotted at intervals, as is usual. This drum or cylinder is secured upon a shaft, a, at one side of its center, said shaft having also friction disks or rolls b, which are designed, when the cable or line is wound upon the drum, to bear upon the driving-wheels of the planter or check-row machine. The motion of the driving-wheels will be transmitted through or by means of the friction rolls or disks to the drum and its shaft and cause the rotation of the drum or reel, and as the machine is moved toward the fastened end of the line or cable effect the winding of the line or cable upon the reel or drum. The reel-shaft is hung and has its bearing on straps f of standards d, and is secured in position by means of the vertical rods C and brace-rod e. With the reel or drum thus connected to the machine the friction rolls or disks will rest upon the driving-wheels, and by the weight of the appliance, including the drum or reel, cause frictional contact between the said rolls or disks and wheels sufficient, with the movement of the wheels, to wind up the line or cable. To isolate the friction rolls or disks from the wheels when it is desired to unwind the line or cable, standards d are provided, with their upper ends strapped to the shaft or axis of the drum or reel, while their lower ends are supported upon the frame of the machine or hooked into eyes thereon.

This device or appliance enables the ready and easy winding and unwinding of the cable or line in laying off the field for the check-row and planting machine and in its removal from the field.

I am aware that it is not new to mount a drum or reel upon a frame, such construction having been employed in hose-reels and also in planters.

I claim and desire to secure by Letters Patent—

The combination, in a check-row-reel attachment to planters, of the drum A, mounted on the axle a, conveying the friction-rollers b b, journaled in the hinged or pivoted arms d d on the main frame of the vertical rods C, and brace-rods e for holding the friction-rolls in contact with the periphery of the bearing-wheels, substantially as shown, and for the purpose described.

In testimony whereof I affix my signature in presence of two witnesses.

WILLIAM O. TUTTLE.

Witnesses:
GUY H. TUTTLE,
FRANK SLOCON.